G. W. GLASS.
Car Wheel.
No. 10,816.            Patented Apr. 25, 1854.
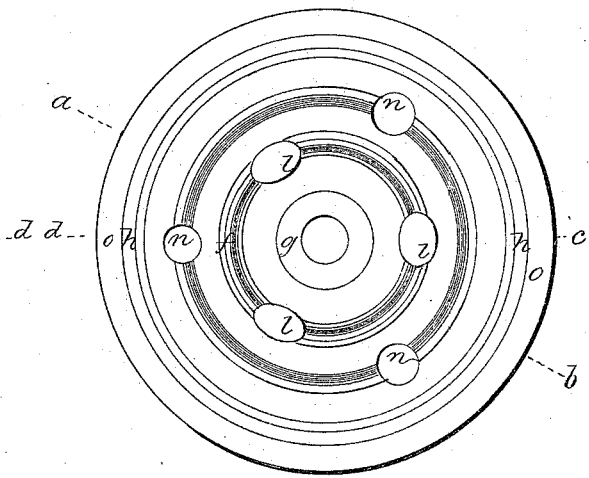
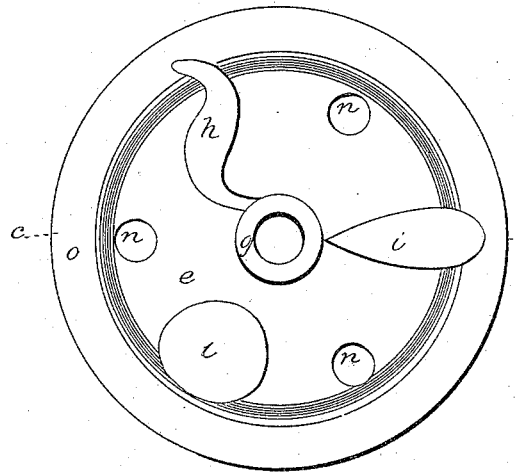
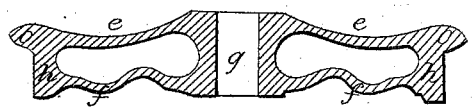
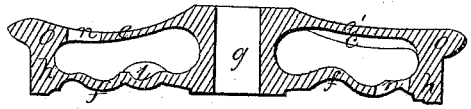
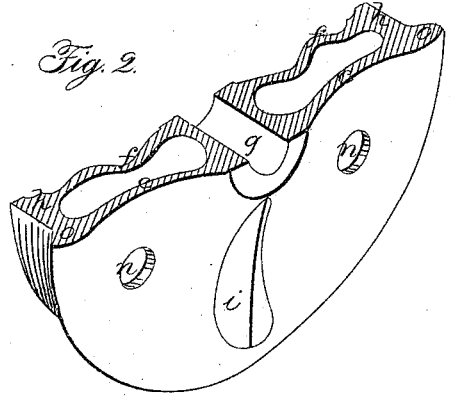
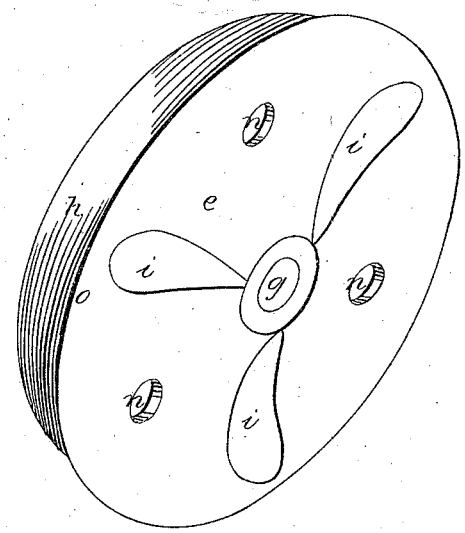
Witnesses:            Inventor:

UNITED STATES PATENT OFFICE.

GEORGE W. GLASS, OF ALLEGHENY CITY, PENNSYLVANIA.

CAST-IRON CAR-WHEEL.

Specification of Letters Patent No. 10,816, dated April 25, 1854.

*To all whom it may concern:*

Be it known that I, GEORGE W. GLASS, of the city of Allegheny, in the county of Allegheny and State of Pennsylvania, have invented a new and Improved Mode of Constructing Railroad-Car Wheels; and I do hereby declare that the following is a full and exact description thereof, reference being had to the accompanying drawings, forming part of this specification, and to the letters of reference marked thereon, the same letters in the several drawings referring to similar parts of my wheels.

In the accompanying drawings Figure 1, is a perspective view of my improved car-wheel, the inner side being turned toward the eye. Fig. 2, is a perspective view of one half of a wheel showing a section through the center of the hub, in the same position as Fig. 1. Fig. 3, is a sectional view of the wheel through $a$—$b$ (see Fig. 5). Fig. 4, is a sectional view through $c$—$d$ (Figs. 5 and 6). Fig. 5 is a plane vertical view of the outer disk or side of my wheel. Fig. 6 is a plane vertical view of my wheel, showing the inner disk or side, being the same side exhibited in Fig. 1, with the difference that in Fig. 6 three different kinds or shapes of braces $i$, $k$, and $l$, are all shown on one disk, whereas only one kind (marked $i$) are shown on Fig. 1.

My improved car-wheels are to be made of cast iron, consisting of two disks or sides $e$ and $f$ with a space between them, connected by the hub and the rim and flange, supported and strengthened by braces $i$, $i$, $i$, extending from or placed between the hub and rim. All the several parts of my wheel being cast in one piece. The wheel is dished inward as shown in the sectional Figs. 3 and 4, the inner face of the hub $g$ projecting beyond the plane of the flange $o$.

In casting my wheels the necessary core holes are left in either or both disks, as may be most convenient, they are necessary to support the core in casting, and surrounding the hub at a convenient distance from the rim, serve their purpose without impairing the strength of the wheel.

The inner disk of the wheel, $e$, is of the shape shown in the drawings—(seen more plainly in Fig. 3), of an uniform thickness throughout and being made with a curve inward and gradually increasing in curvature from the hub to the rim of the wheel the point of greatest curvature being at or near its junction with the rim and flange. By this arrangement the periphery of the inner disk $e$ is under the flange and rim supporting them at the point where the tread of the rim unites with the flange. The outer disk $f$, is of the shape shown in Fig. 3 being also of uniform thickness throughout. This disk $f$ is not dished, but its general bearing is perpendicular or at right angles to the axis of the wheel. Its shape is a strongly waved line with one semi-circular convex projection near the rim of the wheel and a corresponding semicircular concave projection near the hub. There is no angle formed at the point of contact between the two disks and the hub, and rim of the wheel as the disks $e$ and $f$ are united to the rim $h$ and hub $g$ by an arch either semicircular as in the drawings (see Figs. 3 and 4) or elliptical, or by two segments of a circle and a straight line connecting them. I prefer however the semicircular arch. These arches are continuous under the rim and around the hub and greatly add to the strength of the wheel by supporting it at the hub and rim.

In each of the disks are cast braces $i$, $i$, $i$, (or $k$ and $l$, see Figs. 4 and 6,) which are projections outward in the surface of the disks, without increasing the thickness of the metal, the braces being cast of one piece with the disks and the rest of the wheel and being of the same thickness as the disks. These braces are placed between the hub and the rim of the wheel and may be three or more in number around the wheel, at equal distances apart. These braces may be of any of the three shapes shown in Fig. 6, being of such a conformation as to present a curved surface in all directions. The highest point of the pear shaped brace $i$ (see Figs. 1 and 4) represented by a dotted line in Fig. 2, being slightly curved inward, although not so much so as the surface of the disk $e$. The object of these braces is not so much to allow of the expansion and contraction in cooling of the metal composing the disks (which however is a very necessary end to be accomplished, and which they are admirably calculate to do,) as to give additional strength and firmness to the wheel without adding materially to the quantity of metal used and consequent weight of the wheel. These braces are designed to be placed on eithe or both of the disks as may be desired, and different shapes of braces may be used on the inner and outer disk of the same wheel if preferred. The serpentine brace $k$, will probably best subserve the purpose, but any of them will not only support the disks and rim and flange of the wheel but also allow of the peripheral as well as diametrical expansion and contraction of the disks, and thus prevent the cracking of the wheel which would otherwise ensue.

Having thus described my improved wheel, what I claim as my invention is not the corrugating the disk of cast iron car wheels to render them susceptible of contraction and expansion, nor yet do I claim the making of car wheels with a space between the inner and outer disks or sides, as both these devices are well known; nor do I claim the use of core holes in casting car wheels, but

What I do claim as my invention and desire to secure by Letters Patent is—

The constructing of cast iron car wheels of the shape and conformation described in the foregoing specification, and shown in the accompanying drawings, being wheels with two disks united at the rim and tread and at the hub, by a semicircular or semi-elliptical arch, the greatest external curvature of the inner disk being immediately under the flange and below the point of contact of the flange and tread, for the better supporting the flange and tread, in combination with the braces of the construction and shapes shown in the drawings.

GEO. W. GLASS.

Witnesses:
N. A. GRAY,
W. BAKEWELL.